United States Patent [19]

Tamura et al.

[11] Patent Number: 4,457,589
[45] Date of Patent: Jul. 3, 1984

[54] ELECTRO-OPTIC DEVICE WITH PARTICULAR LOCATION OF ELECTRODE CROSS-OVERS

[75] Inventors: Katsuhide Tamura, Soka; Yuichi Maski, Kawasaki, both of Japan

[73] Assignee: Canon Kabushiki Kaisha, Tokyo, Japan

[21] Appl. No.: 341,807

[22] Filed: Jan. 22, 1982

[30] Foreign Application Priority Data

Feb. 16, 1981 [JP] Japan .................................. 56-21125

[51] Int. Cl.$^3$ ............................................. G02F 1/133
[52] U.S. Cl. ..................................................... 350/336
[58] Field of Search .................... 350/336, 339 R, 357, 350/340, 341, 343, 344; 340/785

[56] References Cited

U.S. PATENT DOCUMENTS

| | | | |
|---|---|---|---|
| 3,981,560 | 9/1976 | Heyman et al. ..................... | 340/785 |
| 3,994,567 | 11/1976 | Matsuo et al. ...................... | 350/341 |
| 4,097,121 | 6/1978 | Tauer ................................... | 350/336 |
| 4,202,606 | 5/1980 | Wild ..................................... | 350/334 X |
| 4,235,526 | 11/1980 | Berman et al. ................... | 350/336 X |
| 4,277,147 | 7/1981 | Arnoldussen ........................ | 350/357 |
| 4,297,004 | 10/1981 | Nishimura et al. .................. | 350/336 |

*Primary Examiner*—John K. Corbin
*Assistant Examiner*—David Lewis
*Attorney, Agent, or Firm*—Fitzpatrick, Cella, Harper & Scinto

[57] ABSTRACT

An electro-optic device comprises a seal spacer provided at the outer peripheral portion of a pair of facing electrode plates and an electro-optic substance arranged within said seal spacer, at least one of said electrode plates being provided with an electrode at outside of said seal spacer, characterized in that the other electrode plate facing the electrode plate with said electrode has a surface facing said electrode outside said seal spacer, the surface being constituted of an insulating substance.

34 Claims, 9 Drawing Figures

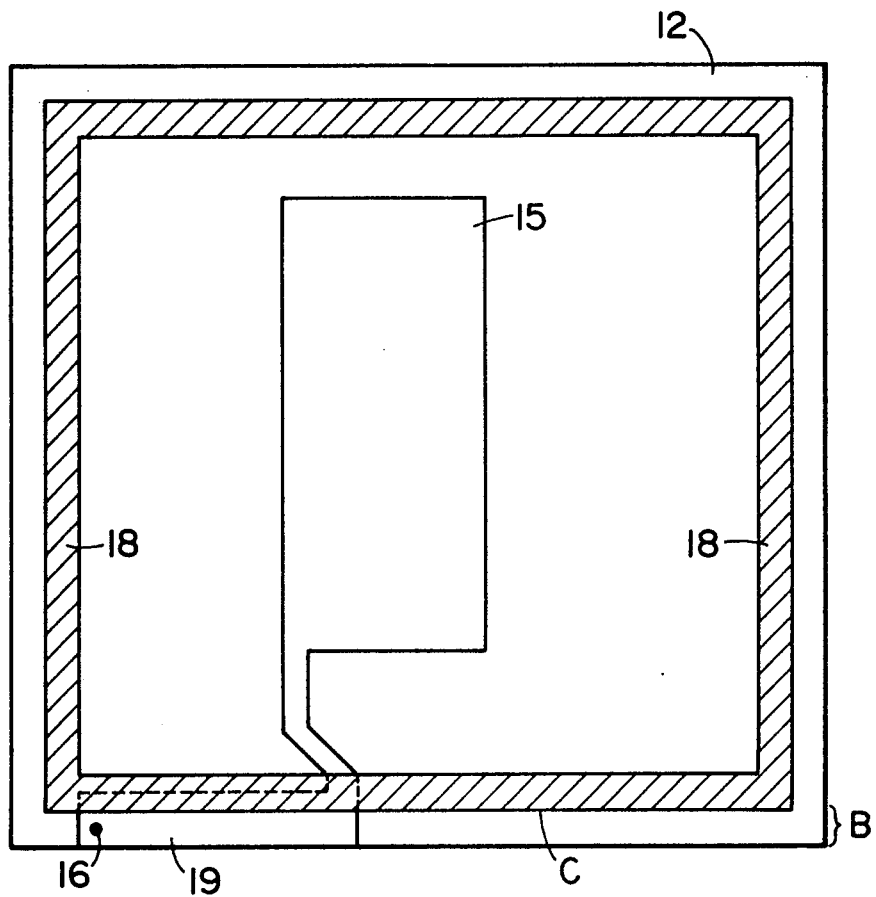
FIG. IB
PRIOR ART

ELECTRO-OPTIC DEVICE WITH PARTICULAR LOCATION OF ELECTRODE CROSS-OVERS

BACKGROUND OF THE INVENTION

1. Field of the Invention

This invention relates to an electro-optic device. More particularly, the present invention pertains to a display device using an electro-optic substance such as liquid crystal, electrochromy, etc.

2. Description of the Prior Art

In electro-optic devices, particularly liquid crystal display devices, for the purpose of effecting simple or easy connection between electrode terminal portion in the outer electronic circuit for driving said device and the electrode terminal portion of the liquid display device, there has generally been adopted a system in which the substrate having a display electrode provided thereon is elongated in the longitudinal direction longer than the counterelectrode substrate; the terminal electrodes from the display electrodes and the electrodes for shortcircuit of counterelectrodes are arranged concentratedly on the portion protruded out of the overlapped portion when both substrates are opposed to each other. With such an arrangement, in some cases, there may occur cross-over between the lead electrodes of the upper and lower substrates in the course of leading out the electrodes to the terminals. On the other hand, in liquid crystal display devices, the effective display area is desired to be as large as possible and hence cross-over of lead electrodes on the upper and lower substrates has been designed to be done at the outside of the seal spacer. Particularly, in recent liquid crystal display devices, there is frequently used a dynamic drive system to simplify the electrode structure. As an advantage by adoption of a dynamic drive system, there may be mentioned marked decrease in number of the lead wires as compared with those in the electrode structure employed in a static drive system of prior art. For example, each segment electrode in an electrode structure having plural number of segments of a figure 8 (multi-digit display) arranged in parallel is to be electrically connected through lead electrodes to the terminals arranged concentratedly on one of the substrates, lead electrodes for the common electrode are arranged in the horizontal direction to make each electrode electrically in parallel to each other. As the result, there is caused cross-over at some points between the horizontally arranged lead electrodes for common electrodes and the lead electrodes for the counterelectrodes which are vertically arranged. When such a cross-over exists within the portion filled with liquid crystal it will appear as an unnecessary display. For this reason, the cross-over as described above has been intended to occur outside the seal spacer.

Whereas, in a device having such opposite electrodes outside the seal spacer, moisture tends to adhere to the space between these electrodes during usage for a long period. Moreover, since the space between the two substrates in a conventional liquid crystal display device is as small as 0.3 to 30 microns, preferably 0.6 to 15 microns, moisture droplets that adhere once to the space cannot easily be removed. As a consequence, these moisture droplets that adhere to the space between the electrodes may be electrolyzed on the electrodes by current passage between the electrodes, whereby the wires at electrodes may be broken. Further, when an electroconductive minute impurity exists in the space between the electrodes, it may also excite a shortcircuit state to cause erroneous actuation.

BRIEF DESCRIPTION OF THE DRAWINGS

FIG. 1B is a plan view of a lower electrode plate of a prior art;

SUMMARY OF THE INVENTION

An object of the present invention is to provide an electro-optic device, especially a liquid crystal display device which has overcome the drawbacks as mentioned above.

Another object of the present invention is to provide an electro-optic device, especially a liquid crystal display device which has been fabricated to be free from the breaking of wires at electrodes.

Still another object of the present invention is to provide an electro-optic device, especially a liquid crystal display device, which has been fabricated to be free from erroneous actuation through shortcircuit between electrodes.

According to the present invention, there is provided an electro-optic device comprising a seal spacer provided at the outer peripheral portion of a pair of facing electrode plates and an electro-optic substance arranged within said seal spacer, at least one of said electrode plates being provided with an electrode outside of said seal spacer, characterized in that the other electrode plate facing the electrode plate provided with said electrode has a surface facing said electrode outside of said seal spacer, the surface being constituted of an insulating substance.

DESCRIPTION OF THE PREFERRED EMBODIMENTS

Figure 1A:
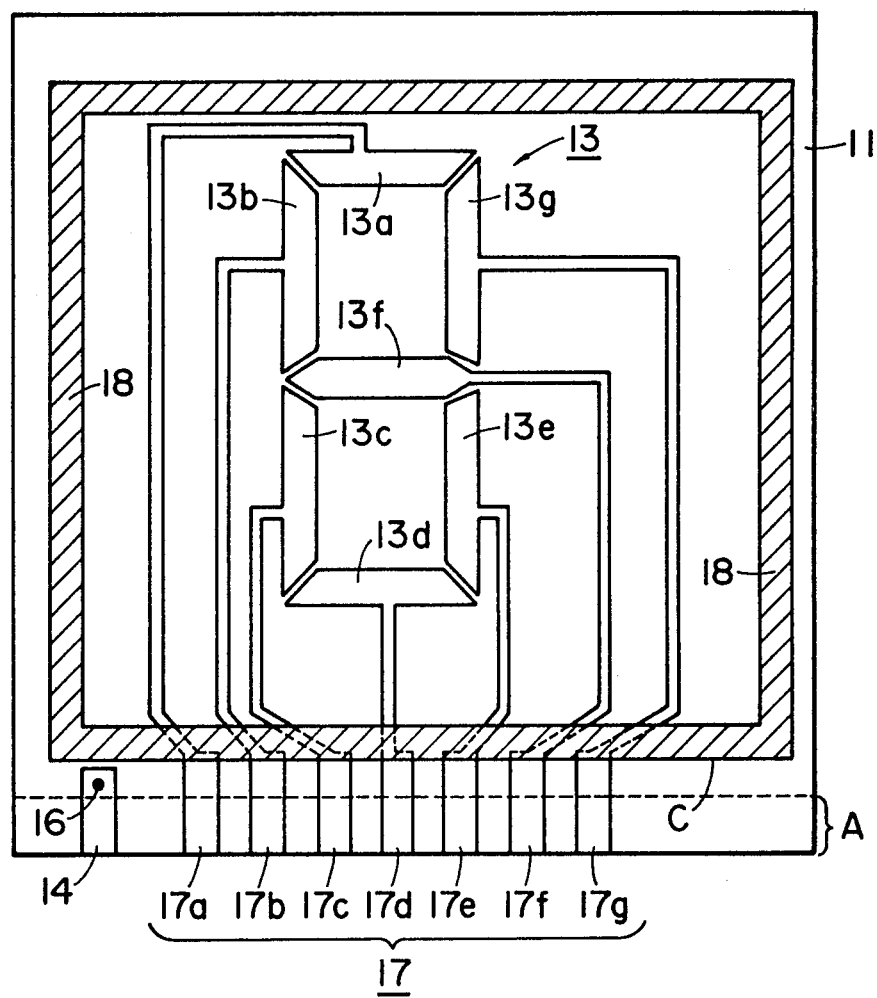
FIG. 1A is a plan view of an upper electrode plate in an electro-optic device.

FIG. 1 shows an electro-optic device of prior art and there are shown the upper electrode plate used in the device in FIG. 1A and the lower electrode plate in FIG. 1B, respectively.

On the upper plate 11, there are provided display electrodes 13 (13a, 13b ... 13g), terminal electrodes 17 (17a, 17b ... 17g) drawn out through the lead electrodes from said display electrodes 13 and the electrode for shortcircuit 14 for the counterelectrode 15. There is spaced between the above electrode for shortcircuit 14 and the terminal electrode 19 drawn out from the counter electrode 15 a shortcircuit member such as a metal foil or an electroconductive adhesive. The upper substrate 11 is longer in the longitudinal direction than the lower substrate 12 so that a protruded portion A may be formed when it is superposed on the lower substrate 12. In a liquid crystal display device constituted by sealing of a liquid crystal substance (not shown) between the substrates 11 and 12 by the seal spacer 18, necessary letters are displayed by application of a voltage between any of the terminal electrodes 17a, 17b . . . 17g and the electrode for shortcircuit 14.

The terminal electrode 19 is generally arranged at the outside portion B of the seal spacer, particularly at the edge portion of the lower substrate 12.

In a display device of prior art as described above, however, the terminal electrodes 17 and 19 are arranged to have a structure facing each other. With such a structure, after use for a long period, electrolysis of adhered moisture may be caused on the electrodes by current passage, whereby the breaking of wires at the electrodes may disadvantageously be caused. Further, when an electroconductive minute impurity exists between the electrodes, a shortcircuit state may be created to cause erroneous actuation.

The electro-optic device according to the present invention, especially the liquid crystal display device, has overcome the drawbacks as mentioned above. More specifically, in a display device comprising a seal spacer provided at the outer peripheral portion of a pair of facing electrode plates and an electro-optic substance arranged within said seal spacer, at least one of said electrode plates being provided with an electrode outside of said seal spacer, the display device is characterized in that the other electrode plate facing the electrode plate provided with said electrode has a surface facing said electrode outside of said seal spacer, which surface is constituted of an insulating substance.

The present invention is described below by referring to the drawings.

Figure 2:
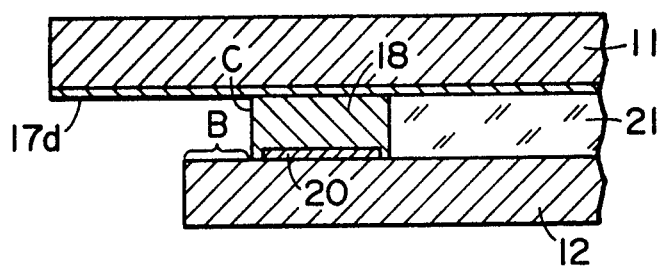
FIG. 2 is a partially sectional view of an electro-optic display device according to the present invention.
Figure 3:
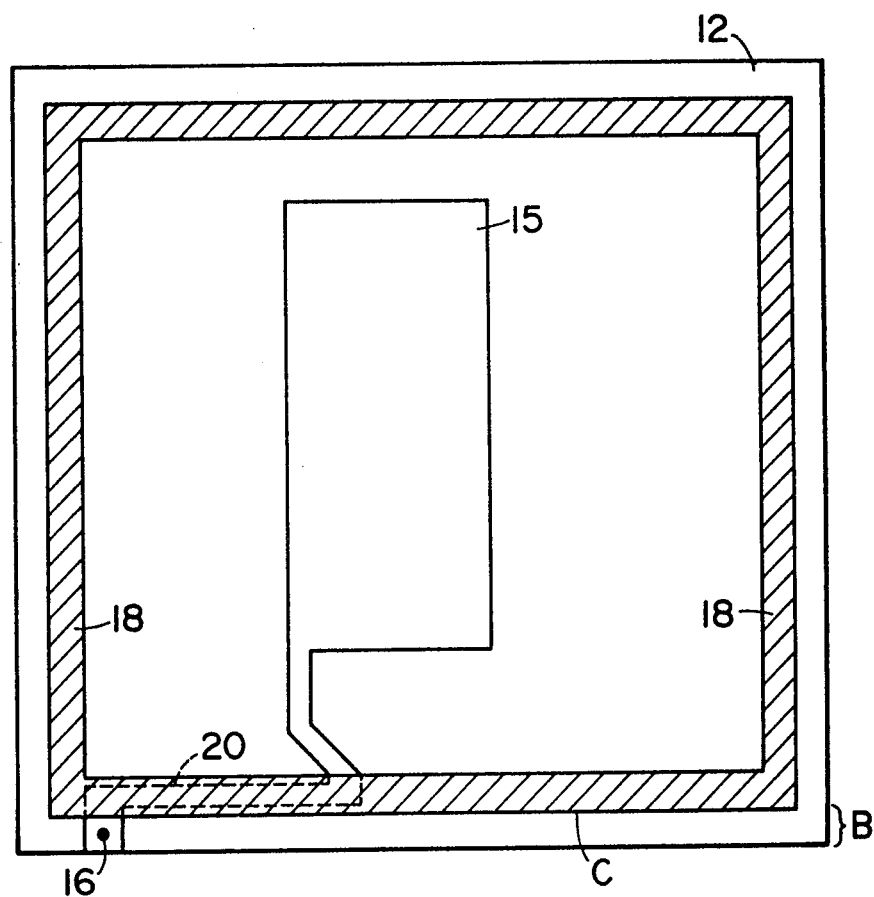
FIG. 3 is a plan view of a lower electrode plate to be used in the present invention.

FIG. 2 shows a partially sectional view of the electro-optic display device according to the present invention and FIG. 3 a plan view of the lower substrate to be used in the present invention (in these Figures, the same symbols as in FIG. 1 mean the same members).

In FIG. 2 a numeral 20 shows the terminal electrode drawn out through a lead electrode from the counterelectrode, indicating further an embodiment in which the edge of such a terminal electrode 20 coincides with the outside seal line C or is positioned inside of the outside seal line C. It is not necessarily required that all of the edge portions should coincide with the outside seal line C or be positioned inside thereof, but they may also be positioned outside the outside seal line C at the sites not facing the terminal electrode 17 provided on the upper substrate 11. An electro-optic substance is indicated by 21. The space between the substrates 11 and 12 is generally 0.3 to 30 microns, preferably 0.6 to 15 microns.

Figure 4A:
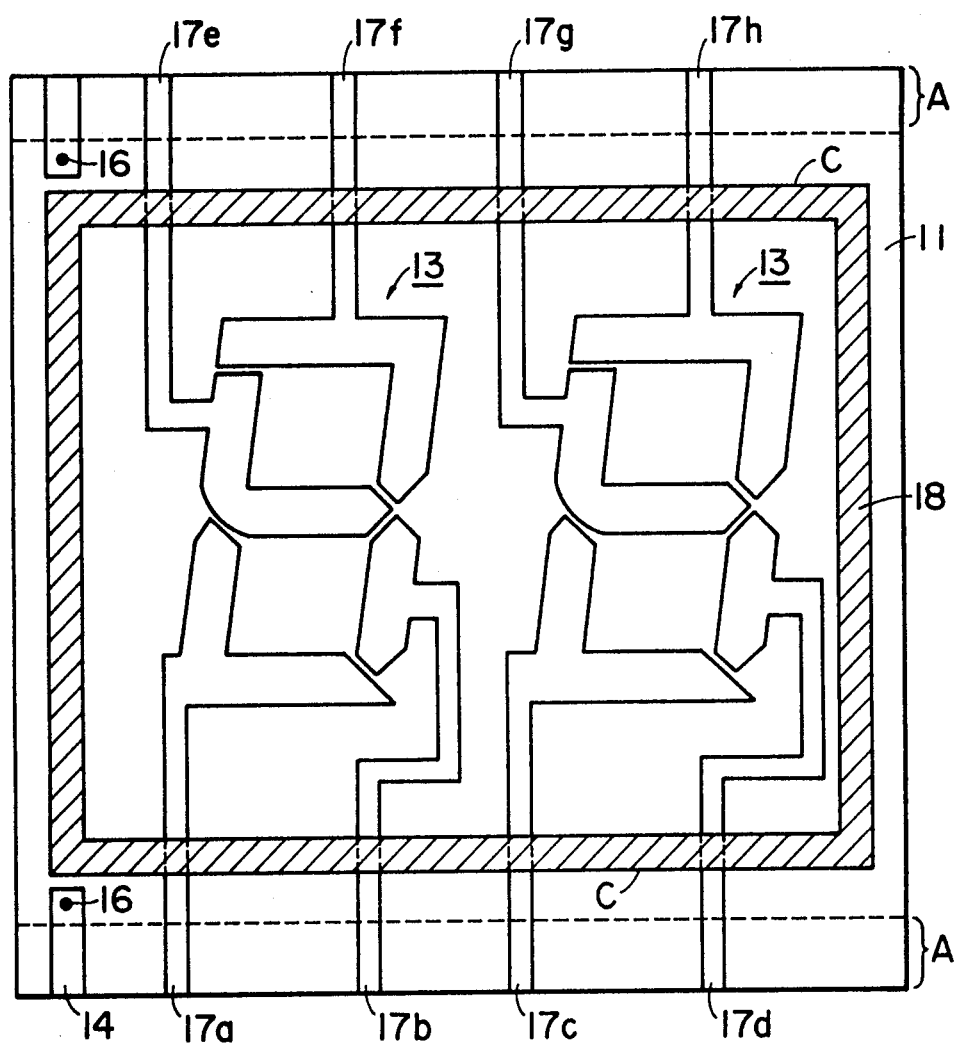
FIGS. 4A and 4B, and FIGS. 5A and 5B are plan views of each pair of electrode plates in other embodiments of the present invention.
Figure 4B:
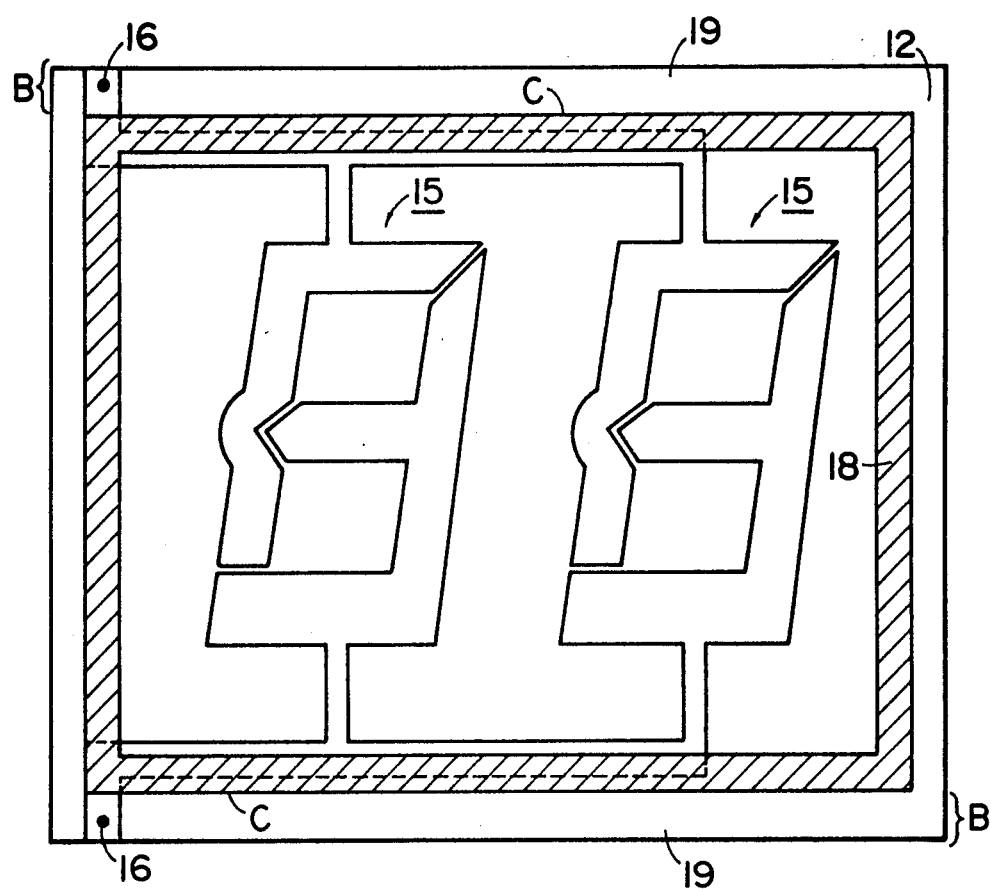

FIG. 4 shows a plan view of another embodiment of the present invention, in which FIG. 4A is an electrode structure of a common electrode used in the dynamic drive system and FIG. 4B an electrode structure of a display electrode (in these Figures, the same symbols as in FIG. 1 mean the same members).

In FIGS. 4A and 4B, each of the lead electrodes connecting electrically the terminal electrodes of 17a, 17b, 17c, 17e, 17f and 17g with the display electrode 13 forms a cross-over with each lead wire connecting electrically the common electrode 15 with the electrode for shortcircuit 14. In the present invention, these crossovers are formed within the seal spacer 18 and hence there exists no facing electrode except for the electrode for shortcircuit 14 outside of the spacer 18. In this case, such cross-over as described above may also be present in the portion filled with liquid crystal in the present invention, so long as the effective display surface is not impaired thereby. While an electrode structure of a two-digit display is shown in the present embodiment, the present invention may be better applied to a liquid crystal device employing an electrode structure of three-digit or more plural-digit display. In particular, the present invention may suitably be applied to a liquid crystal display device employing an electrode structure constituted of a multi-digit with two bound segments as shown in FIG. 4 or three bound segments not shown in the Figure.

Figure 5A:
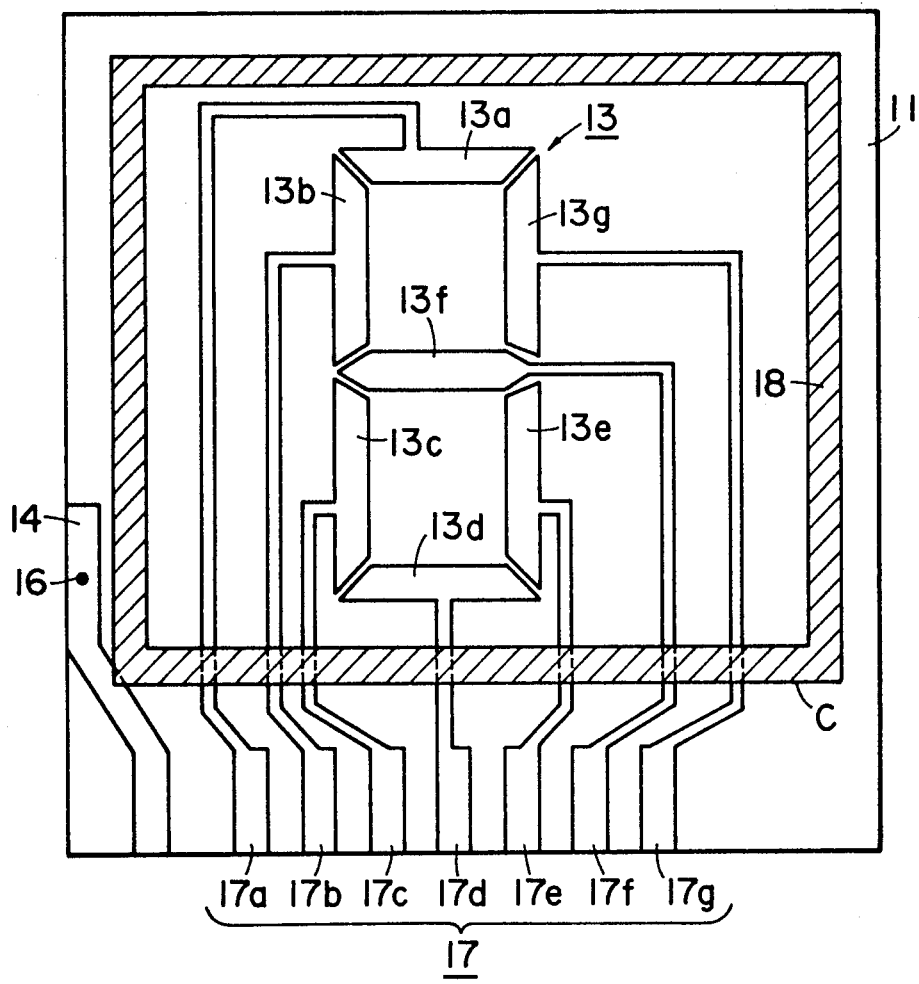
Figure 5B:
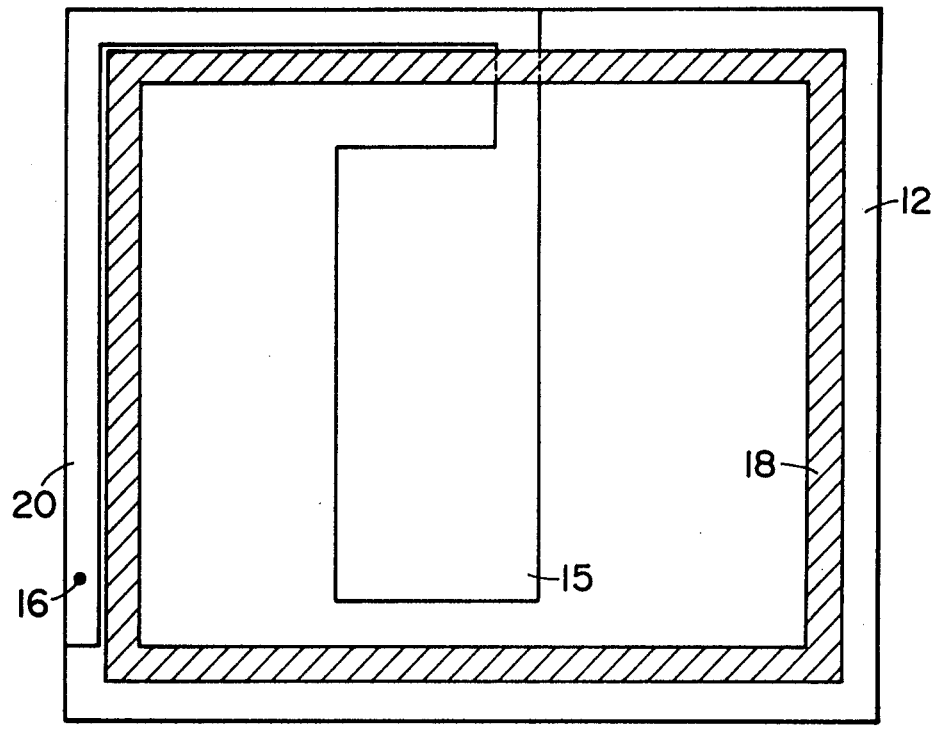

Another embodiment according to the present invention includes a display device constituted of a pair of electrode plates as shown in FIGS. 5A and 5B (in these Figures, the same symbols as in FIGS. 1 through 3 mean the same members). Such a device, which has no facing electrode except for the electrode for shortcircuit 14 at the outside portion of the seal spacer 18, is free from electrolysis occuring at the electrodes. Thus, there is no danger of the breaking of wires at the electrodes. Further, no shortcircuit is expected to occur even when an electroconductive impurity exists between the electrodes.

The counterelectrode 15 can be shortcircuited to the electrode for shortcircuit 14 by sandwiching the short-circuiting member 16 between the electrode for shortcircuit 14 and the terminal electrode 20 led from the counterelectrode 15.

It is not necessarily required in the present invention to arrange a shortcircuiting member outside of the seal spacer 18, but alternatively it may be arranged within the seal spacer 18.

In accordance with the present invention, the surface of the substrate 12 facing the terminal electrode 17 may consist of the surface of the substrate 12 formed of an insulating substance or be formed by a covering of an insulating substance and therefore it can prevent the shortcircuit or the breaking of wires occuring outside of the seal spacer 18.

Figure 6:
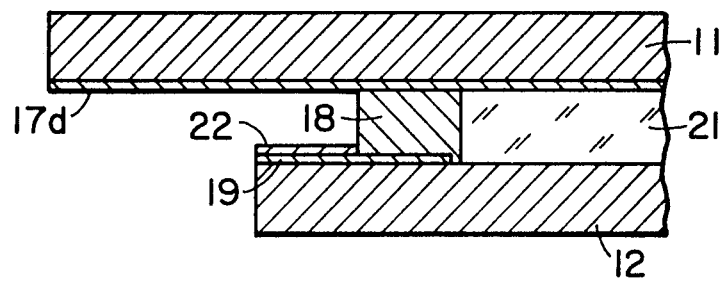
FIG. 6 is a partially sectional view of another embodiment of the electro-optic devices according to the present invention.

As the substrates 11 and 12 for supporting the electrodes, there may be employed insulating materials such as transparent glass plates or plastic plates (e.g. polyethylene terephthalate, acrylic resins, polyethylene, polyvinyl chloride, polycarbonate etc.). It is not necessarily required that these substrates be transparent. As insulating materials which can cover the surface of the substrate 12 facing the terminal electrode 17, it is possible to use inorganic insulating materials such as SiO, $SiO_2$, $TiO_2$ and the like, or organic insulating materials such as polyimides, polyamides, polyethylene, polyfluoroethylene, poly-p-xylylene, etc. The insulating layer thereby formed may be coated wholly over the outside of the seal spacer 18. Also, as shown in FIG. 6 (the same symbols as in FIG. 1 mean the same members), there may be interposed an electrode 19 between the insulating layer 22 and the substrate 12, but it is required that the insulating layer should have a film thickness sufficient to insulate the electrode. The film thickness of the insulating layer 22 is generally in the range of from 100 Å to 10000 Å, preferably 100 Å to 2000 Å.

In the present invention, it is also possible to provide a display electrode on the lower substrate and use a counterelectrode on the upper substrate.

As the displaying method utilizable for the electro-optic device of the present invention, there may be mentioned a method utilizing for display a dynamic scattering phenomenon in which nematic liquid crystal material having a negative dielectric anisotropy scatters light by application of an electric field, or a method in which optical rotation is imparted to nematic liquid crystal material having a positive dielectric anisotropy by orientation so as to have a twisted structure and the optical rotation is changed by action of a suitable electric field to be utilized for display. As liquid crystal material, other than the afore-mentioned nematic liquid crystal, there may also be employed smectic liquid crystal or cholesteric liquid crystal singly or as a combination of two or more species. In particular, there may be added a small quantity of a cholesteric liquid crystal (e.g. cholesteryl chloride, cholesteryl oleyl carbonate, cholesteryl bromide, cholesteryl nonanoate, etc.) as an optically active substance to a nematic liquid crystal or a mixed nematic liquid crystal having a positive dielectric anisotropy.

When the aforesaid twisted liquid crystal mode is selected for the electro-optic device of the present invention, it is preferred to coat an orientation film which also functions as an insulating layer as disclosed in U.S. Pat. Nos. 3,700,306; 3,864,021; 3,955,881; or 3,994,567 on the substrates 11 and 12, respectively. More specifically, on each of inner surfaces of a pair of electrode plates, there is coated a film of an insulating material such as SiO, $SiO_2$, polyimides, polyesterimides, polyamides, polyfluoroethylene, cellulose resins, polyethylene, poly-p-xylylene, etc. and each surface is subjected to rubbing treatment so that respective directions of orientation may be perpendicular to each other. Then, into a cell assembled in a conventional manner, there is injected a nematic liquid crystal having a positive dielectric anisotropy and the inlet for injection is sealed. Thus, a display device utilizing twisted nematic liquid crystal mode can be prepared.

As the display electrode 13, the terminal electrodes 17, 20, the electrode for shortcircuit 14 and the counter-electrode 15 to be used in the present invention, there may be employed a thin film of tin oxide or indium oxide, which may be provided either partially or wholly on one surface by means of, for example, the vapor deposition.

As the shortcircuting member 16 used in the present invention, it is possible to use a metal foil or an electroconductive adhesive. A metal foil can be selected from a wide range of materials, including, for example, aluminum foil, silver foil, copper foil and the like. An electroconductive adhesive is a dispersion having metallic powders such as of silver, gold, copper, aluminum or carbon black dispersed in an organic resin adhesive. In the present invention, any of these materials may suitably be selected. As an organic resin adhesive, there may be mentioned an epoxy resin type adhesive and also ethylene-vinyl acetate copolymer resin, unsaturated polyester resins, etc. As an electroconductive paste, commercial products such as electroconductive paste "H-31D" (produced by Epoxy Technology Co., U.S.A.) may also be usable.

The seal spacer 18 used in the present invention may be formed by coating an epoxy resin type adhesive according to such a method as screen printing on at least one of the electrode plates so that the edge portion of the terminal electrode 20 may coincide with the seal line C or positioned inside thereof and then heating the coated film.

The present invention is further described by referring to the following Example.

EXAMPLE 1

There were prepared glass electrodes on which electrode patterns (of indium oxide) as shown in FIG. 1A and FIG. 3 were respectively provided.

Then, on the surfaces of electrode corresponding to the inside portion of the seal spacer to be arranged later, there were provided respectively films of $SiO_2$ of 1000 Å thickness by the vacuum deposition method which were then subjected to rubbing treatment on each surface with a cloth so that the directions of orientation may be crossed at right angles to each other.

As the next step, on the lower substrate 12, there were coated by the screen printing method an epoxy type adhesive (DER 736, Dow Chemical) having glass fibers of 10μ diameter dispersed therein for formation of a seal spacer 18 and an electroconductive paste (H-31 D: Epoxy Technology) for formation of a shortcircuiting member 16 to provide the seal spacer 18 and the shortcircuting member 16. Thereafter, the upper substrate 11 was superposed on the lower substrate. There were also arranged a pair of electrode plates so that the rubbing directions may be crossed at right angles to each other.

Into the space between the pair of glass electrode plates, there was filled a mixed nematic liquid crystal having a positive dielectric anisotropy as shown below, followed by sealing the inlet for injection to prepare a cell. Then, the cell was sandwiched between a pair of crossed polarizing plates to prepare a liquid crystal display device.

| Mixed liquid crystal | Parts by weight |
| --- | --- |
| p-Methoxybenzylidene-p'-n-butylaniline | 50 |
| p-Ethoxybenzylidene-p'-n-butylaniline | 50 |
| p-n-Propylbenzylidene-p'-cyanoaniline | 5 |
| p-Pentyl-p'-cyanobiphenyl | 100 |
| p-Hexyl-p'-cyanobiphenyl | 25 |
| p-Amyloxy-p'-cyanobiphenyl | 5 |
| p-Hexyloxy-p'-cyanobiphenyl | 3 |
| (+)-p-Isoamyloxy-p'-cyanobiphenyl | 0.1 |

Through the liquid crystal display device, current was continuously passed at a voltage of 5.5 V under the conditions of a temperature of 85° C. and a relative humidity of 85%. As the result, no breaking of wires occurred even after 1000 hours. There was also no trouble caused by shortcircuit.

COMPARATIVE EXAMPLE 1

A liquid crystal device for comparative purposes was prepared in the same manner as described in Example 1 except that the electrode plate as shown in FIG. 1B was used in place of the electrode as shown in FIG. 3.

When continuous current passage was performed under the same conditions as in Example 1, breaking of wires occurred after 195 hours. There also occurred the trouble by short-circuit state due to invasion of electroconductive minute impurities.

As the electro-optic substances used in the present invention, there may also be included electrochromic substances as disclosed in U.S. Pat. Nos. 4,059,341; 4,073,570 and 4,116,535, in addition to the liquid crystals as described above.

What we claim is:
1. An electro-optic device comprising:
    a pair of electrode plates including a first electrode plate provided with a common electrode having a first lead wire and a second electrode plate facing said first electrode plate, said second electrode plate being provided with a counterelectrode having a second lead wire, and one of said pair of electrode plates having a protruding portion provided with a terminal electrode and a shortcircuit electrode, the shortcircuit electrode being electrically connected to said first lead wire from the common electrode;

a seal spacer provided between said pair of electrode plates positioned at an outer peripheral portion of each of said pair of electrode plates, said seal spacer defining an inner and an outer seal line, such that cross-overs between said first lead wire from the common electrode and the said second lead wire from the counterelectrode are formed inside the outer seal line and the electrical connection of the shortcircuit electrode with said first lead wire from the common electrode is formed outside the inner seal line; and an electro-optic substance provided between said pair of electrode plates inside the inner seal line defined by said seal spacer.

2. An electro-optic device according to claim 1 wherein the pair of electrode plates has a gap with a distance of 0.3 to 30 microns therebetween.

3. An electro-optic device according to claim 2 wherein the pair of electrode plates has a gap with a distance of 0.6 to 15 microns therebetween.

4. An electro-optic device according to claim 1 wherein said seal spacer is formed by an adhesive containing glass-fiber.

5. An electro-optic device according to claim 4, wherein the adhesive is an epoxy adhesive.

6. An electro-optic device according to claim 1, wherein the electrical connection of the shortcircuit electrode with said first lead wire from the common electrode is carried out by an electroconductive adhesive.

7. An electro-optic device according to claim 6, wherein the electroconductive adhesive is an epoxy adhesive containing metallic powder or carbon black.

8. An electro-optic device according to claim 1 wherein the electro-optic material is a liquid crystal.

9. An electro-optic device according to claim 8 wherein the liquid crystal is a nematic liquid crystal having a negative dielectric anisotropy.

10. An electro-optic device according to claim 8 wherein the liquid crystal has a positive dielectric anisotropy.

11. An electro-optic device according to claim 10 wherein the liquid crystal is a mixture of a nematic liquid crystal and an optically active material.

12. An electro-optic device according to claim 11 wherein the optically active material is a cholesteric liquid crystal.

13. An electro-optic device according to claim 11 wherein the nematic liquid crystal has a twisted structure.

14. An electro-optic device according to claim 8 wherein the liquid crystal is a mixture of nematic crystals having a positive dielectric anisotropy.

15. An electro-optic device according to claim 14 wherein the liquid crystal is a mixture of a nematic liquid crystal and an optically active material.

16. An electro-optic device according to claim 15 wherein the optically active material is a cholesteric liquid crystal.

17. An electro-optic device according to claim 15 wherein the nematic liquid crystal has a twisted structure.

18. An electro-optic device comprising:

a pair of electrode plates including a first electrode plate provided with a common electrode having a first lead wire and a second electrode plate facing said first electrode plate, said second electrode plate being provided with a counterelectrode having a second lead wire, and one of said pair of electrode plates having a protruding portion provided with a terminal electrode and a shortcircuit electrode, the shortcircuit electrode being electrically connected to said first lead wire from the counterelectrode;

a seal spacer provided between said pair of electrode plates positioned at an outer peripheral portion of each of said pair of electrode plates, said seal spacer defining an inner and an outer seal line, such that cross-overs between said first lead wire from the common electrode and the said second lead wire from the counterelectrode are formed inside the outer seal line and the electrical connection of the shortcircuit electrode with said first lead wire from said counterelectrode is formed outside the inner seal line; and an electro-optic substance provided between said pair of electrode plates inside the inner seal line defined by said seal spacer.

19. An electro-optic device according to claim 18 wherein the pair of electrode plates has a gap with a distance of 0.3 to 30 microns therebetween.

20. An electro-optic device according to claim 19 wherein the pair of electrode plates has a gap with a distance of 0.6 to 15 microns therebetween.

21. An electro-optic device according to claim 18, wherein said seal spacer is formed by an adhesive containing glass-fiber.

22. An electro-optic device according to claim 21, wherein the adhesive is an epoxy adhesive.

23. An electro-optic device according to claim 18, wherein the electrical connection of the shortcircuit electrode with said second lead wire from the counterelectrode is carried out by an electroconductive adhesive.

24. An electro-optic device according to claim 23, wherein the electroconductive adhesive is an epoxy adhesive containing metallic powder or carbon black.

25. An electro-optic device according to claim 18, wherein the electro-optic material is a liquid crystal.

26. An electro-optic device according to claim 25 wherein the liquid crystal is a nematic liquid crystal having a negative dielectric anisotropy.

27. An electro-optic device according to claim 25 wherein the liquid crystal has a positive dielectric anisotropy.

28. An electro-optic device according to claim 27 wherein the liquid crystal is a mixture of a nematic liquid crystal and an optically active material.

29. An electro-optic device according to claim 28 wherein the optically active material is a cholesteric liquid crystal.

30. An electro-optic device according to claim 28 wherein the nematic liquid crystal has a twisted structure.

31. An electro-optic device according to claim 25 wherein the liquid crystal is a mixture of nematic crystals having a positive dielectric anisotropy.

32. An electro-optic device according to claim 31 wherein the liquid crystal is a mixture of a nematic liquid crystal and an optically active material.

33. An electro-optic device according to claim 32 wherein the optically active material is a cholesteric liquid crystal.

34. An electro-optic device according to claim 32 wherein the nematic liquid crystal has a twisted structure.

* * * * *